Patented July 30, 1935

2,009,712

UNITED STATES PATENT OFFICE 2,009,712

RUBBER COMPOSITION CONTAINING ASPHALTENE

Per K. Frolich, Roselle, N. J., assignor to Standard Oil Development Company

No Drawing. Application September 2, 1932, Serial No. 631,501

10 Claims. (Cl. 106—23)

This invention relates to rubber compositions containing asphaltene.

By asphaltene is meant the class of heavy organic compounds of a hydrocarbon-like nature, solid or semi-solid, non-crystalline, soluble in chloroform, carbon disulfide, carbon tetrachloride and benzol, and practically insoluble in petroleum ether, a petroleum fraction of say about 88° A. P. I. gravity. The asphaltenes are present in naturally occurring asphalts, crude petroleum oils or heavy residua from hydrocarbon oils, especially in the residua from highly cracked oils, and may be obtained therefrom in a dry pulverulent form, hereafter termed "flowers of asphalt", by suitable extraction, precipitation and/or distillation means, of which examples will be given herein. The term "flowers of asphalt" is used to designate the dry, fluffy, irregular form of asphaltenes as obtained in a precipitated form, substantially free of oil. Asphaltenes may also be prepared synthetically by oxidation of various petroleum hydrocarbons, especially cracked residues, at moderate temperatures, or by treatment with sulfur or other reagent which has the property of removing part of the hydrogen from the hydrocarbon.

I have now found that these asphaltenes, or flowers of asphalt, may be used as compounding agents with rubber.

The following example illustrates a method for obtaining a synthetic asphaltene, in the form of flowers of asphalt, and for using it in preparing a rubber composition.

Example 1000 gallons of cracking coil tar, gravity 10° A. P. I., obtained in cracking a petroleum distillate gas oil originally free of asphaltene at a pressure of 750 pounds per square inch, were distilled under vacuum to a still temperature of 660° F. leaving 1334 pounds of bottoms of a softening point of 225° F. (ball and ring method). The bottoms are taken up in 508 gallons of kerosene distillate or other volatile petroleum naphtha solvent of high flash such as "Varsol" in two hot extractions with agitation (391 gallons for first extraction and 127 gallons for extracting the residue). In this way, 1000 pounds of the bottoms are found to be soluble in the "Varsol" leaving 334 pounds of insoluble asphaltenes in the form of flowers of asphalt. These asphaltenes are freed of "Varsol" by drying and are obtained as a dry, fluffy powder, substantially free of hydrocarbon oils and resins.

A commercial grade of latex containing about 60% of rubber is ground in a mortar with 10% of its weight of this asphaltene powder and 3% of sulfur. After thorough mixing in this manner some acetic acid is added to coagulate the latex. The precipitated mass is washed with water for a short time and is then dried and hot pressed at 50 to 100 pounds pressure, mold temperature 155 to 160° C., for 20 minutes. The vulcanized product is black and opaque due to the incorporated flowers of asphalt.

Flowers of asphalt are preferred for preparing rubber compositions over natural asphalts, crude oil residua, tars and the like which possess objectionable odors and/or oils and pitchy substances which tend to render rubber compositions in which they are present tacky or greasy. The flowers of asphalt are obtained in a dry, fluffy or powdery form and are substantially free of such objectionable substances. They are suitable for incorporation with latex, as shown above, but may also be added with suitable mixing, grinding or milling to coagulated rubber and compositions containing it.

The asphaltenes may also be used in preparing softeners for use in rubber compositions. For example, a mixture of 1 part of wax acids, such as are obtained by the oxidation of petroleum wax, with 5 to 10 parts of flowers of asphalt may be prepared by heating the wax acids and stirring the flowers of asphalt into the fluid mixture. Slabs of this softener containing 5 to 20% wax acids may also be made by pressing. In case the powdered form of the asphaltene is not used, the composition may be brought into the form of slabs or lumps by thorough milling or mixing and careful heating to sinter the mass. This softener may then be mixed with rubber according to the usual practice.

Asphaltenes in general may be used in my rubber compositions but the naturally occurring asphaltenes obtained from hydrocarbon oil residua may possess objectionable characteristics rendering them unsuitable for extended application. On the other hand, an asphaltene preferred for use in rubber compositions may be obtained by extraction or oxidation from the residuum of gas oil and other petroleum distillate oils which have been cracked at elevated temperatures and pressures. The asphaltenes obtained by these methods may be called synthetic asphaltenes of petroleum origin as they are obtained from petroleum distillate oils originally containing no asphaltenes.

Other selective solvents capable of mixing with hydrocarbon oils and resins but having little solvent power for the asphaltenes may be used in obtaining asphaltene in the form of flowers of asphalt in place of the "Varsol" shown in the above example. Among these solvents are the alcohols, for example, methyl, ethyl, propyl, butyl and amyl alcohols, which may be used either alone or mixed with each other or mixed with hydrocarbon oils such as kerosene or naphtha. Other suitable solvents are light hydrocarbons such as casinghead naphtha or liquefied propane or mixtures of liquefied propane and ethane. Likewise naphtha may be charged with propane and/or ethane under high pressures and used for this purpose.

The flowers of asphalt may be used in preparing rubber stocks suitable for use in footwear, treads and various other applications which will be readily apparent to one skilled in the art.

The term "rubber" is used for the purpose of this application to include latex, caoutchouc, whether natural or synthetic, reclaimed rubber, balata, guayule, gutta percha, rubber isomers and like products, whether or not admixed with fillers, pigments, vulcanizing or accelerating agents.

This invention is not to be limited to any theory of the composition of the asphaltenes nor to their action when used in rubber compositions, nor by any examples which are given herein solely for purpose of illustration, but only by the following claims in which I wish to claim all novelty insofar as the prior art permits.

I claim:

1. A rubber composition incorporated with an asphaltene powder derived from cracked petroleum tar substantially free of hydrocarbon oils and resins.

2. A rubber composition incorporated with flowers of asphalt derived from cracked petroleum tar.

3. A rubber composition incorporated with flowers of asphalt derived from cracked petroleum tar and substantially free from hydrocarbon oils and resins.

4. A rubber composition containing flowers of asphalt derived from a cracked tar product of a hydrocarbon oil distillate and free from mineral acids.

5. A rubber composition containing flowers of asphalt derived from cracking coil tar.

6. Method for preparing a rubber composition comprising preparing a mixture containing latex and flowers of asphalt, coagulating the latex in said mixture and vulcanizing the mixture.

7. Method for preparing a rubber composition comprising preparing a mixture containing rubber and flowers of asphalt from an asphaltene derived from cracked petroleum and vulcanizing the mixture.

8. Method for preparing a rubber composition comprising preparing a mixture containing rubber and a purified precipitated asphaltene of cracked petroleum tar origin substantially free of hydrocarbon oils and resins and vulcanizing the mixture.

9. A rubber composition incorporated with a synthetic finely precipitated asphaltene of cracked petroleum tar origin and substantially free of hydrocarbon oils and resins.

10. A rubber composition incorporated with an asphaltene in purified, precipitated condition obtained from heavy petroleum residua, and substantially free from oils, resins, and acids.

PER K. FROLICH.